April 8, 1930.  C. W. BURNHAM  1,753,878
RECEPTACLE FOR SILVERWARE
Original Filed Nov. 23, 1923
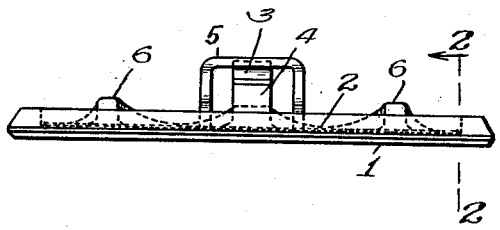
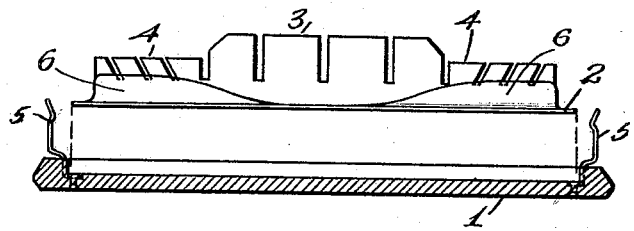

Patented Apr. 8, 1930

1,753,878

UNITED STATES PATENT OFFICE

CHESTER WALBRIDGE BURNHAM, OF ONEIDA, NEW YORK, ASSIGNOR TO ONEIDA COMMUNITY, LIMITED, OF ONEIDA, NEW YORK, A CORPORATION OF NEW YORK

RECEPTACLE FOR SILVERWARE

Original application filed November 23, 1923, Serial No. 676,471. Divided and this application filed October 29, 1924. Serial No. 746,470.

This invention relates to improvements in receptacles for flat tableware, that is, knives, forks, spoons, &c., and is a division of application No. 676,471, filed Nov. 23, 1923, which has matured into Patent No. 1,529,462, issued Mar. 10, 1925.

It is the object of the invention to provide a two-part receptacle for such articles consisting of a shallow serving tray, having low upwardly extending walls or flanges, and an article carrier fitting therein and removable therefrom and provided with a notched rack extending above the walls of the tray, and having notches which are of such depth relatively to the walls of the tray that the articles therein will project above said walls.

A further object of the invention is to combine with this notched rack a support between it and a side wall of the tray for engaging and supporting the articles mounted in and projecting from the rack; two such supports being preferably provided and arranged on opposite sides of the rack.

In the accompanying drawing—

Figure 1 is a side elevation of a receptacle embodying the improvements of the present invention, and Figure 2 is a section thereof on the line 2.

Referring to said drawing, 1 represents the tray and 2 the carrier for the articles. The carrier is readily removable from the tray. Its dimensions relatively to the tray are such that, when in position therein, it can have no objectionable amount of sidewise or endwise movement.

When the carrier 2 is removed from the tray (see Fig. 2) the latter may be used as a serving tray. When the carrier 2 is returned to it, the tray will serve also as a suitable receptacle in which the flatware on the carrier may be transported to and from the place of use in the home or to the store or other place where the flatware is to be displayed and sold.

The carrier 2 is provided with a notched rack 3, 4, for the knives, forks, spoons, &c. and this rack, it will be observed, is of such depth that, when the carrier is in the tray 1, it will project upwardly beyond the walls of the latter.

It will also be observed that the notches in the rack 3, 4, are of such depth that the articles mounted therein will also project upwardly beyond the sides of the tray so that they will be displayed sidewise, as well as plain view.

For the support of the articles mounted in and projecting from the rack 3, 4, a support 6 is provided, preferably on each side of the rack and between it and edge of the carrier 2. These also support the articles above the sides of the tray.

To provide for the convenient handling of the tray 1, particularly when used as a serving tray, it is equipped with a handle 5 at each end.

What I claim is—

A two-part receptacle for flat tableware comprising a shallow serving tray having low upwardly extending marginal sides and a removable article carrier snugly mounted therein and provided with a transversely extending rack intermediate the ends of the removable article carrier, said rack provided with notches and having a central portion projecting above the end portions, the whole of the upper surface of the rack and the notches therein projecting above the upper edges of the marginal sides of the tray, and a support disposed upon either side of the rack and projecting above the sides of the tray, said support being located between the rack and the edge of the carrier for engaging and supporting the articles mounted in and projecting from the rack and cooperating with the rack to support said articles above the sides and ends of the tray.

In testimony whereof, I have hereunto set my hand.

CHESTER WALBRIDGE BURNHAM.